Patented Nov. 6, 1928.

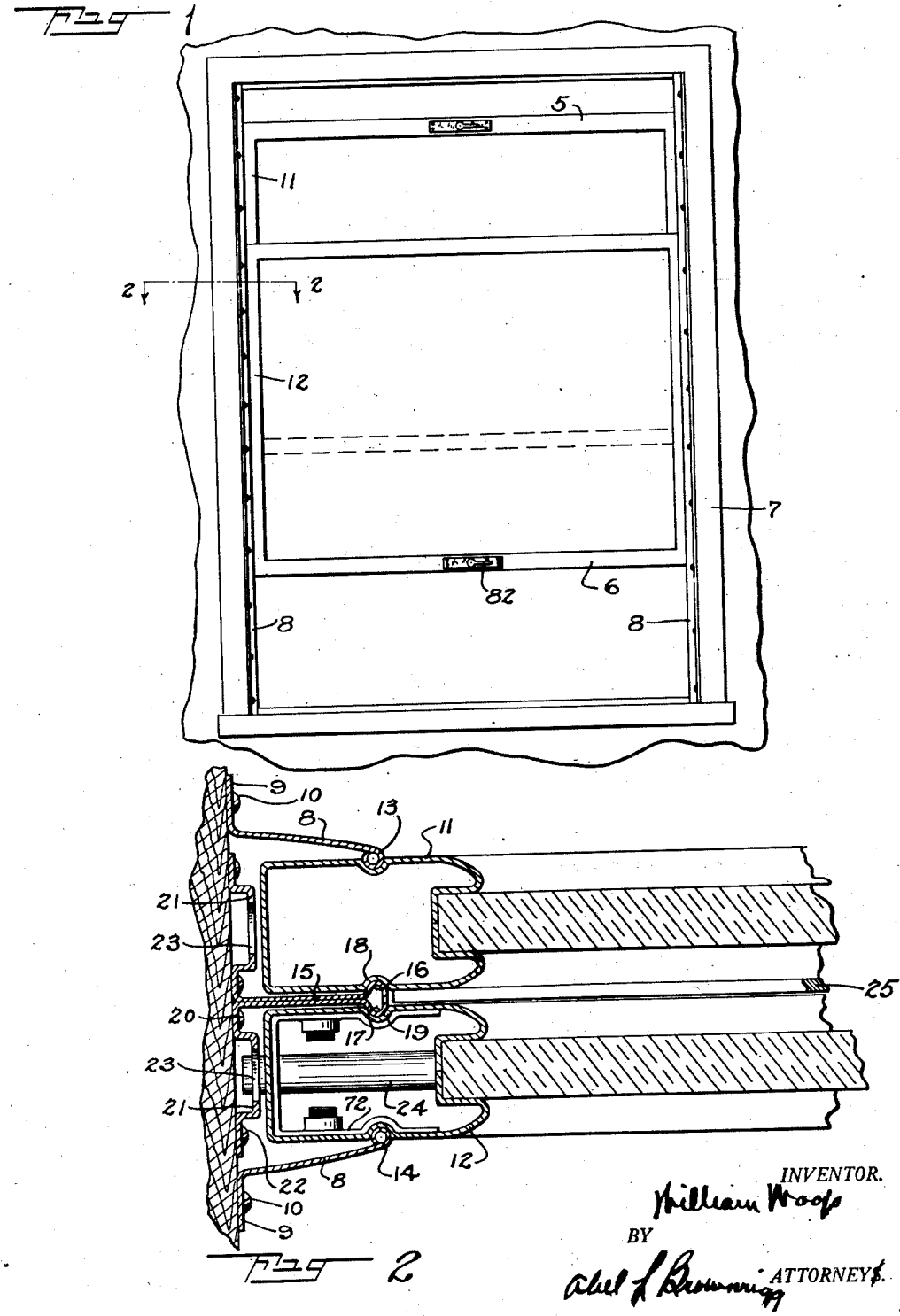

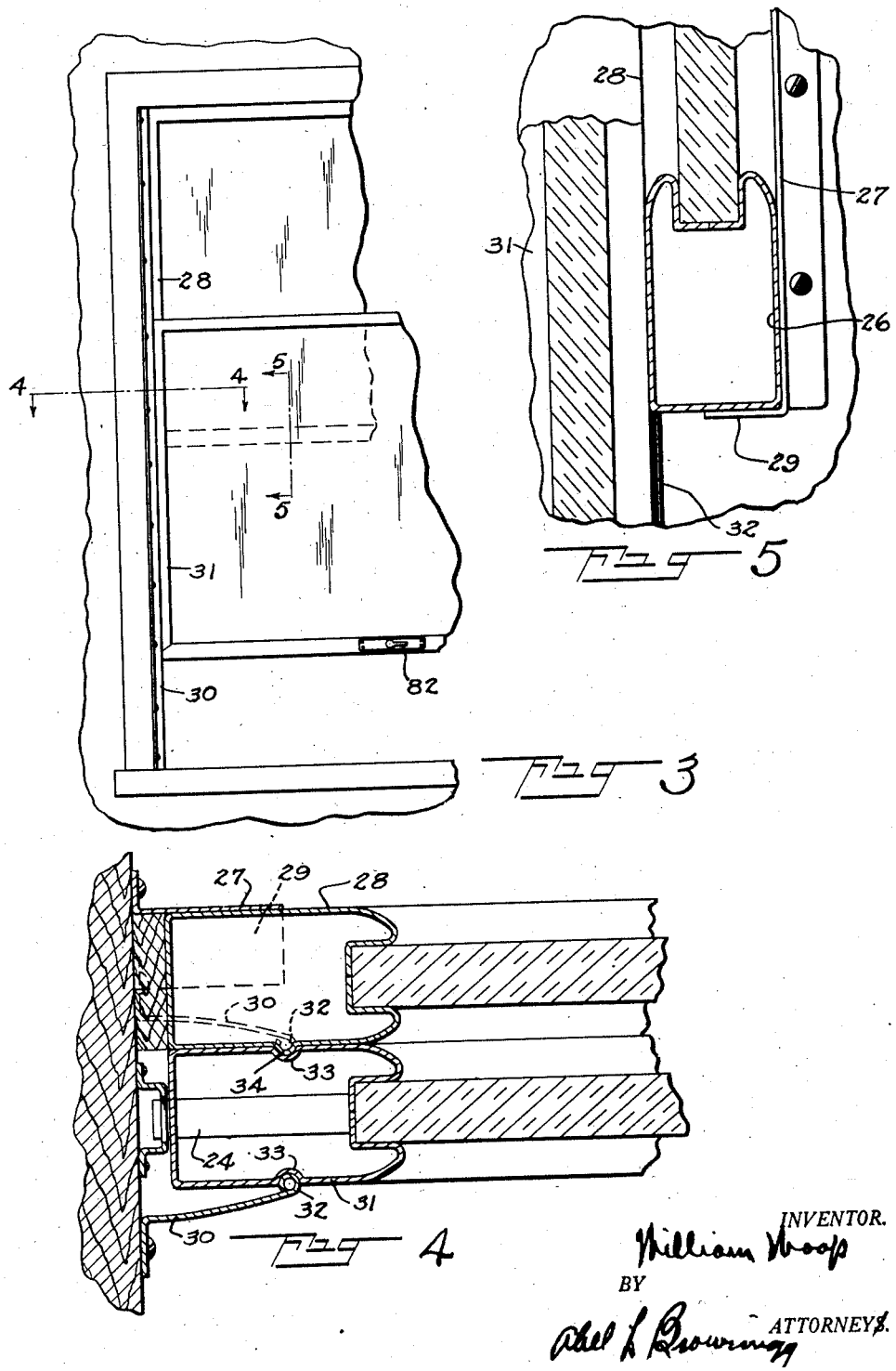

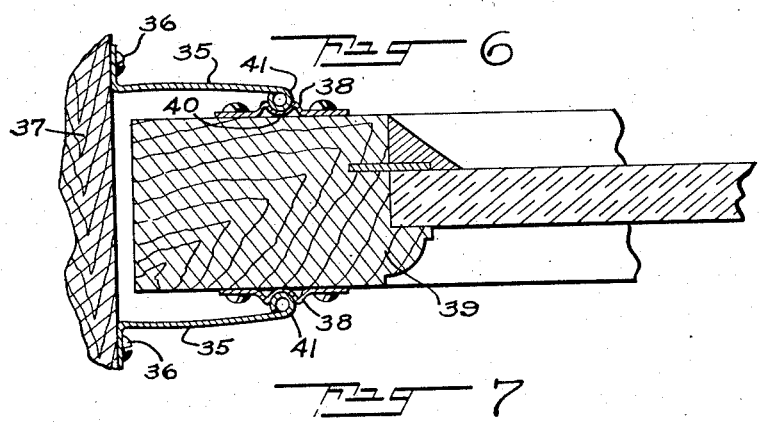
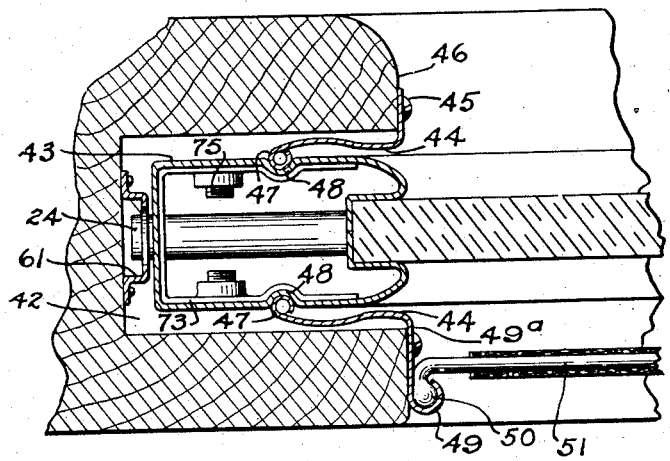
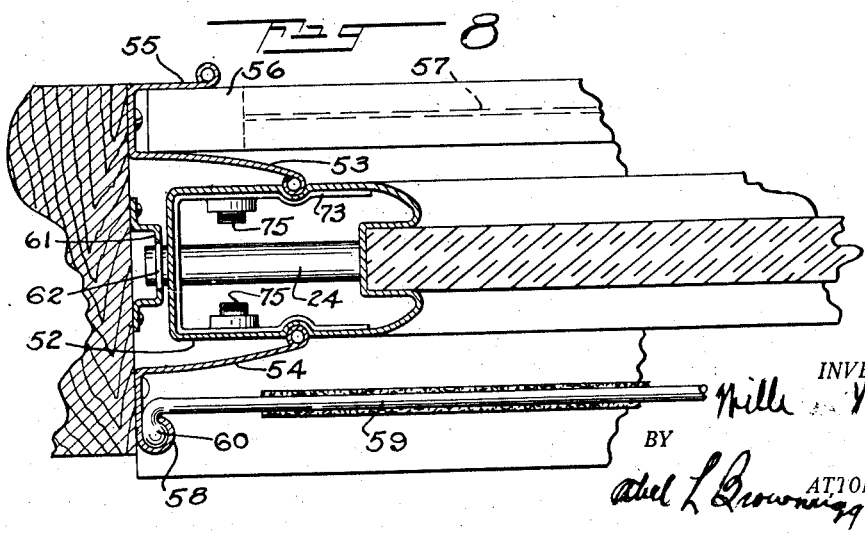

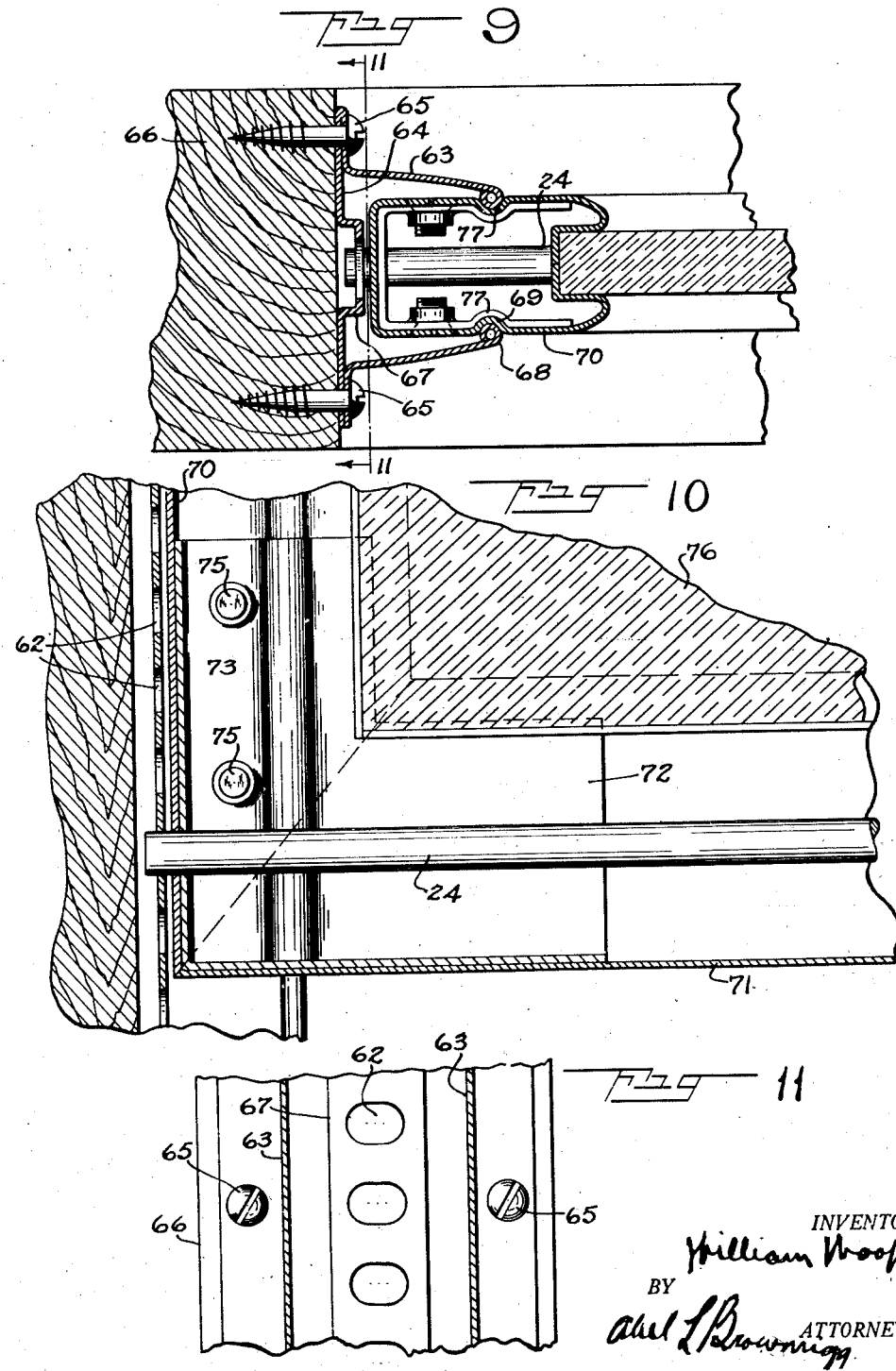

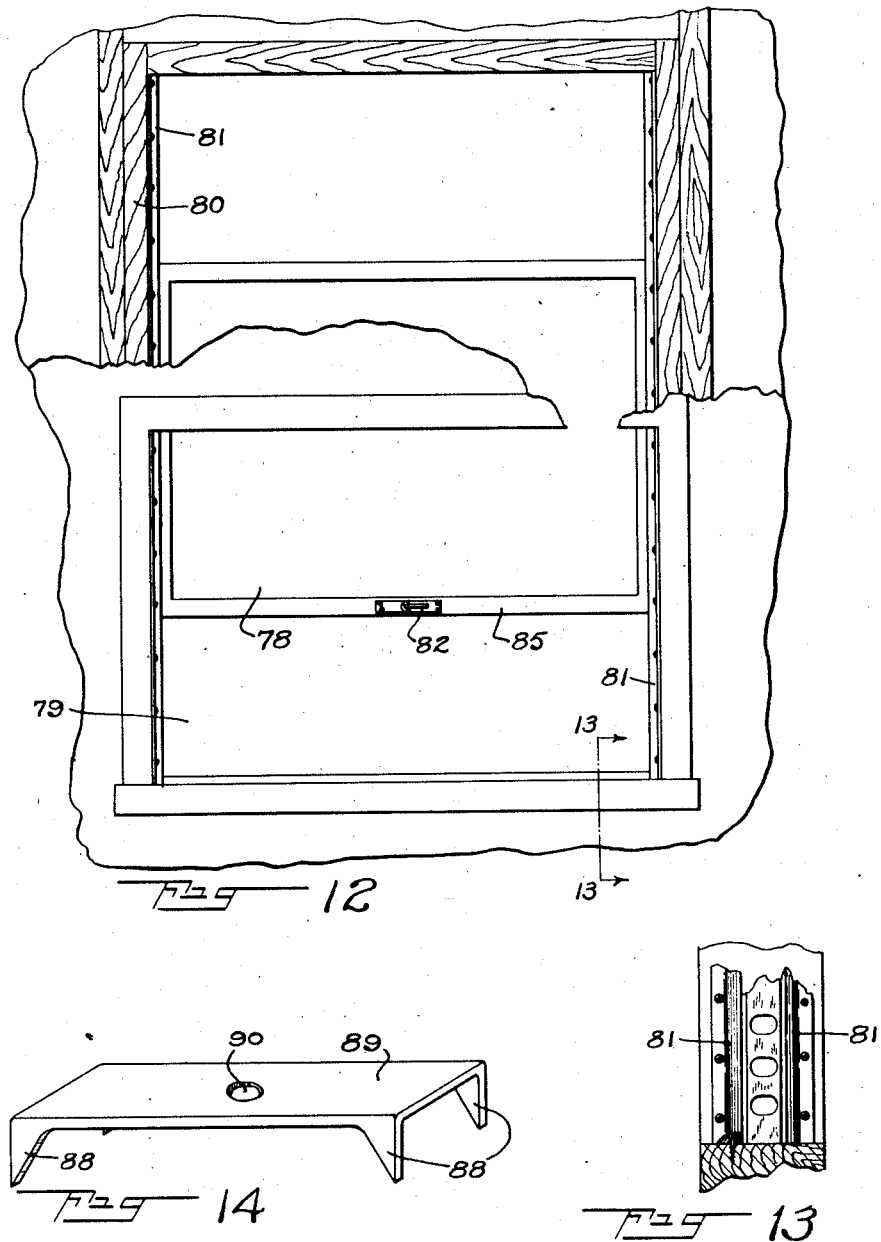

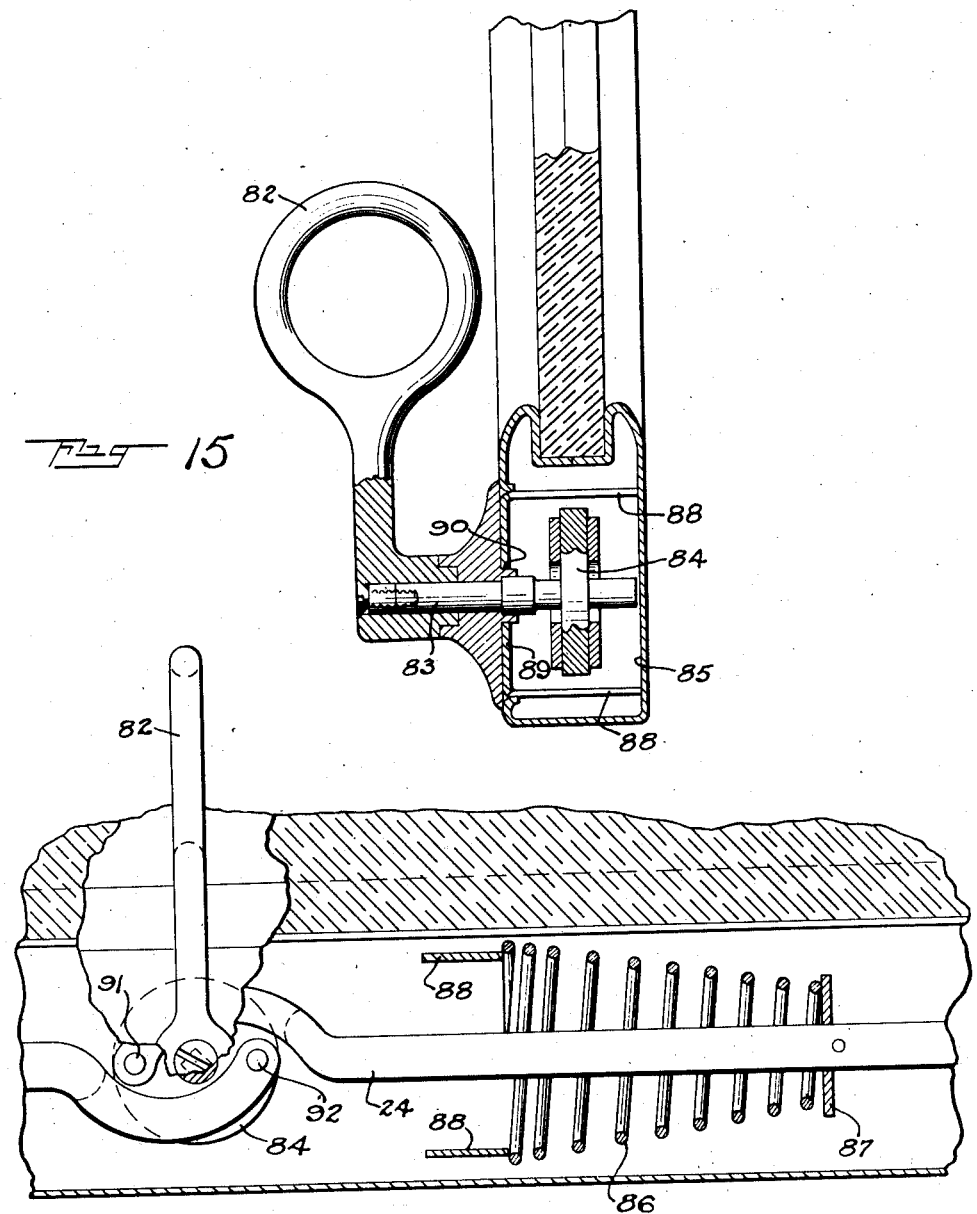

1,690,518

UNITED STATES PATENT OFFICE.

WILLIAM WOOP, OF FARMINGDALE, NEW YORK.

FLEXIBLE WINDOW FRAME AND SASH CONSTRUCTION.

Application filed July 1, 1926. Serial No. 119,829.

This invention relates generally to window construction and more particularly to cooperating frame and sash structure in windows of the sliding sash types.

It is well known that there is a considerable problem involved in producing air and dust tight joints or connections between window sash and frame members which will at the same time provide a sufficient flexibility and smoothness of fit to permit ready movement of the sash in the frame in opening or closing the window. The problem involved is particularly troublesome in connection with high buildings because of the action of powerful wind forces to which lofty structures are peculiarly subject. It is also of special importance in window construction, as applied to marine vessels and to vehicles, either in cars used on steam or electric railroads, or in automobiles of the closed top type, because of the mechanical vibration and the distorting stresses and strains to which windows in such situations are subject. The problem is not, however, confined to the special cases referred to but is applicable generally wherever windows of the sliding sash type are used.

A general object of the present invention is to provide a window frame and sash construction which will be free from the objections referred to and which will combine a weatherproof joint construction with readiness and ease of operation and, in addition, obviate rattling and creaking noises characteristic of prior constructions under certain conditions.

The invention comprises a window frame construction which includes a pair of guide members arranged to exert spring pressure or tension against the interposed sash members, the guide members and engaged sash members being provided with interengaged bead and groove members arranged to slide longitudinally relative to each other and being maintained in tensioned contact under the spring pressure of the guide or frame members.

A feature of the invention resides in a floating or yielding support of the sash which is provided by the resilient gripping action of the frame members. The floating or yielding support thus provided does away with jamming or sticking effects and insures relative ease of manipulation of the sash and movement thereof in the frame guide members under all conditions of operation.

Another feature of the invention resides in the provision of a beaded separating member for double sash members, each of which is movable. The beads are formed on opposite faces of the separating members for engagement with grooves formed for the purpose in the confronting sides of the sash members. In this construction the resilient guide members engage the outside faces of the sash members and press the sash members toward each other and the intervening separating member.

Another feature of the invention resides in the provision of a removable transverse end sash bar to provide for the placing of glass in position in the sash.

Still another feature of the invention resides in a simplified lifting and locking device especially adapted for use with the improved sash construction.

Other features of the invention will be hereinafter described and claimed.

In the drawings in which a preferred embodiment of the invention has been selected for illustration:

Fig. 1 is a view in front elevation of a double window sash construction embodying the invention;

Fig. 2 is a view in transverse section on an enlarged scale taken on the line 2—2 of Fig. 1;

Fig. 3 is a view similar to Fig. 1 showing a double window sash construction in which the upper sash is immovable;

Fig. 4 is a sectional view on an enlarged scale taken on the line 4—4 of Fig. 3;

Fig. 5 is a view in vertical section and on an enlarged scale taken on the line 5—5 of Fig. 3;

Fig. 6 is a view similar to Fig. 4 showing the application of the invention to window constructions of heretofore known types;

Fig. 7 is a view similar to Fig. 6 showing the application of the invention to automobiles of the closed type;

Fig. 8 is a view similar to Fig. 7 showing the application of the invention to railway cars;

Fig. 9 is a view similar to Fig. 8 showing a modified form of the invention as applied to a single slidable window sash;

Fig. 10 is a view in vertical section of a portion of a window sash showing a removable sash section to provide for the insertion of glass in the frame;

Fig. 11 is a view in vertical section taken on the line 11—11 of Fig. 9;

Fig. 12 is a view in vertical elevation and vertical section showing an application of the invention to a window of the movable single sash type;

Fig. 13 is a view in vertical section taken on the line 13—13 of Fig. 12;

Fig. 14 is a view in perspective showing a stop device used in connection with the locking device forming part of the invention;

Fig. 15 is a view in vertical section of a horizontal sash member showing the application of the locking device thereto;

Fig. 16 is a view in vertical section taken at right angles to Fig. 15.

Referring to the drawings for a more detailed description of the invention, a window frame sash construction is shown in Figs. 1 and 2 of the drawings and includes an upper sash member 5 and a lower sash member 6 mounted to slide vertically in a window frame 7. An important feature of the invention resides in the formation of the guiding or directing members 8 of the window frame 7, these members being formed with base flange members 9 adapted to be attached as at 10 to the window frame members 7. The guide members 8 extend outwardly from the supporting base 9 and are inclined toward each other, as is indicated in Fig. 2 of the drawings. The members 8 are formed of metal and so arranged as to have a spring tension or pressure exerted thereon by the nature of the material of which they are made and the formation which is impressed thereon in a suitable forming operation. The guide members 8 are unattached at their upper and lower ends so that the natural spring tension which is inherent therein is constantly exerted against the intervening window sash members 11 and 12.

In order to provide a wind, rain and dust proof joint between the guide members 8 of the window frame and the sash members 11 and 12 of the window sashes, the free extremities or edges of the guide members 8 are provided with beaded or tongued formations 13, the beads thus formed being arranged to enter and engage complementary formed grooves 14 in the outside faces of the sash members 11 and 12. The bead and groove members 13 and 14 extend throughout the length of the guide members 8 and the sash members 11 and 12, as will be clear, so that vertical sliding movement of the sashes 5 and 6 in either direction produces a sliding movement of the grooves 14 with relation to the bead members 13, as will be clear.

It will be seen that with the construction described, a relatively airtight and wind proof joint is provided while, at the same time, because of the floating support of the sash members which is afforded by the tensioned guide or holding members 8, readiness and ease of manipulation of the sash members 5 and 6 is produced.

It will be seen that the guide members 8 referred to engage the opposite outer faces of the sash frame members 11 and 12. In order to produce an equally secure joint with respect to the inner surfaces of the sash frame members 11 and 12, a sash separating member 15 is provided which consists of a sheet metal web member folded on itself to provide bead members 16 and 17 for engagement with grooves 18 and 19 formed in the inner faces of the sash members 11 and 12. The separating member 15 is attached at its base as at 20 to the window frame 7 and laterally extending members 21 are formed which are attached again at 22 to the window frame, an intermediate portion of the laterally extending members being provided with openings 23 formed to receive a bolt 24 arranged to lock the window sash members at any desired elevation. It will be seen that the bead and groove construction produced between the separating member 15 and the engaged surfaces of the sash members 11 and 12 is effective to prevent the passage of air or dust between the parts. In addition, the resilient nature of the separating member 15 provides for a floating support of the window sash members and permits the tensioning action of the guide members 8 to center the window sash members at a balanced position therebetween. A separating or partition member 25 is utilized to fill the space between the upper rail of the lower sash and the lower rail of the upper sash when the sash members are in positions to completely close the window opening.

It will be seen that the hollow window sash members 11 and 12, which are formed of any suitable sheet metal which is satisfactorily resistant to corrosion, are supported completely out of contact with any rigid part so that no binding or jamming action of the movable parts can take place with the result that the window sash members are always capable of being easily manipulated.

A feature of the invention resides in its applicability to window openings wherein it is desired to provide an immovable upper sash and a movable lower sash, as in car window construction. An example of this construction is shown in Figs. 3, 4 and 5 of the drawings wherein an immovable upper sash member 26 is engaged by a metal bracket member 27 along the outer face of the vertical sash member 28. The sash 26 is retained in its elevated position by an angularly turned end portion 29 on the bracket member 27 upon which the sash 26 rests, as is clearly shown in Fig. 5 of the drawings.

In this construction, guide rails 30 are provided for cooperation with the vertical sash 31 of the lower sash 32. The guide members 30 are similar in all respects to the guide members 8 previously described and are provided at their extremities with bead members 32 for sliding cooperation with grooves 33 formed in the opposite faces of the vertical sash members 31. In order to accommodate the movement of the lower sash 31 along the face of the upper and immovable sash 26, a bead or tongue 34 is formed in the inner face of the upper sash member 28 for cooperation with the groove 33 in the lower sash. It will be seen that in this construction no separating member is employed between the sash members 28 and 31.

I provide also for an application of the invention to window constructions already in use. An example of this is shown in Fig. 6 of the drawing wherein wooden guide rails of the old construction have been removed and resilient sheet metal guide members 35 have been used in their stead. The guide members 35 have laterally turned base portions 36 which are attached to the wood window frame member 37. Grooved track members or strips 38 are attached to the opposite faces of the window sash member 39 in such positions that the grooves or seats 40 formed in the track members 38 are engaged by the bead members 41 formed along the outer edges of the guide members 35. The guide members 35 are arranged to exert spring tension or pressure against the grooves which are engaged by the bead members 41 formed thereon so that, as in the applications of the invention already referred to, the window sash member 39 is held in a tensioned floating position which prevents rattling and creaking noises characteristic of window frame constructions heretofore known and used.

In Fig. 7 of the drawings the invention is shown as applied to a window construction in a closed automobile body. The vehicle body is vertically grooved as at 42 to receive the vertical sash members 43 which are spaced apart from the adjacent surfaces of the groove 42 and held in a spring clamped position therein by the action of the guide members 44 attached at 45 to the edges 46 of the window opening and extending into the opening 42 in the frame member on opposite sides of the sash members 43. As in the cases already described, the guide members 44 terminate in bead members 47 which engage grooves 48 formed in the opposite outer surfaces of the sash members 43. In this form of the invention, preferably one of the guide members 44 is provided with an extension 49 on its base portion 49ª which forms a tubular sleeve in which the terminal member 50 of a curtain rod 51 is arranged for vertical sliding movement.

In Fig. 8 of the drawings, an application of the invention is shown as made to the window construction of a Pullman car. The window sash member 52 is engaged on its opposite sides by spring guide members 53 and 54. The guide member 53 is provided with an extension 55 which forms, with the outer surface of the base portion of the guide member 53, a groove in which the frame member 56 of a window screen 57 is arranged to have vertical sliding movement. The other guide member 54 is provided with an extension 58 similar to the member 49 illustrated in Fig. 7 of the drawings. A curtain rod 59 terminates in a member 60 which is free to slide in the tensioned tubular member 58. In Figs. 7 and 8 a perforated locking strip is provided with transversely elongated openings 62 for receiving the end of the locking bolt 24.

In Fig. 9 of the drawings, there is shown an adaptation of the invention in which the guide members 63 are formed integrally with a base member 64 which is attached as at 65 to the window frame member 66 and provides a locking rail 67 intermediate the attached portions thereof. As in the other embodiments of the invention, the guide members 63 terminate in bead members 68 which have sliding engagement with grooves 69 formed in the outer faces of the sash member 7. The locking bolt 24 engages, as in the other examples, in transversely elongated openings 62 formed in the locking strip 67.

In order to provide for the removal of glass from the sash or the insertion of glass into the sash, the construction shown in Figs. 9 and 10 of the drawings is provided. The lower sash bar 71 is provided at its ends with an elbow section 72, the upward extension 73 of which is adapted to be received in a hollow vertical sash bar 70 and is clearly shown in the drawings. The vertical arm 73 of the elbow section 72 is fastened in its position in the lower end of the vertical frame bar 70 by means of screws 75 which are capable of being readily removed in order to replace a broken pane of glass 76. It will be seen that the vertical sections 73 of the elbow members 72 are provided with grooves 77 adapted to form seats for the grooves 69 formed in the vertical frame members 70.

In Fig. 12 of the drawings, there is shown a form of the invention in which a single slidable sash 78 is mounted to close or unclose a window opening 79, the sash being movable vertically to a position in the frame above the window opening. The window frame 80 is provided with spring tensioned guide members 81 throughout its length, both in the area of the window opening 79 and to a distance above the window opening equal in height to the height of the window opening itself.

In order to manipulate the various movable sash members referred to, a handle member 82 is provided which is attached to a rotatable stem 83 mounted in a central portion of either the upper or lower rail of the sash member. The rotatable stem 83 of the handle member is attached to a disc 84 mounted within the hollow sash member 85 and to which the inner extremities of the locking bolts 24 already referred to are attached in a diametrically opposed pivoted relation as at 86 and 87. With this construction, it will be seen that a normal and locked position of the parts is produced when the handle member 82 is rotated to a position parallel with the rail 85 on which it is mounted. On the other hand, an unlocked position of the locking bolts 24 is produced when the handle member 82 is moved to a position at right angles to the sash member 85 corresponding to a position to which the handle is moved when it is swung in the line of pull necessary to be applied in raising the window. Spring members 86 engage washers 87 attached to the bolts 24 at one end and rest against branches 88 of a stop member 89 having an opening 90 therein through which the stem 83 of the locking device passes.

What I claim is:

1. In a window frame and sash construction, a longitudinally slidable sash member provided with a longitudinally extending groove in one of its lateral faces, a resilient guide member having a bead formed thereon for engagement with said groove, and means for engaging the opposite face of the sash member.

2. In a window frame and sash construction, a longitudinally slidable sash member provided with longitudinally extending grooves in its opposite lateral faces, a spring-tensioned guide member having a bead formed thereon for engagement with said groove, and a guiding bead member engaging the groove in the opposite face of the sash member.

3. In a widow frame and sash construction, a longitudinally slidable sash member provided with longitudinally extending grooves in its opposite lateral faces, a pair of spring-tensioned guide members mounted on opposite sides of the sash member and having bead members formed thereon for engagement with said grooves in the lateral faces of the sash member.

4. In a window frame and sash construction, a longitudinally slidable sash member provided with longitudinally extending grooves in its opposite lateral faces, guide members formed of spring sheet metal mounted on the window frame and inclined toward each other and the intervening window sash member, and bead members formed on the guide members for engagement with said grooves.

5. In a flexible mounting for windows, longitudinally grooved metal strips adapted to be attached to the inner and outer surfaces of the vertical sash members, resilient guide members adapted to be attached to the window frame and to be inclined inwardly in gripping relation to the sash, and bead members formed on the guide members for slidable engagement with said grooves.

6. In a resilient mounting for vehicle windows, the window frame being provided with vertical sash-receiving recesses at the opposite sides of the window opening, the sash members being provided with grooves in the opposite sides thereof, the sides of the sash members being spaced from the side walls of the recesses, and resilient guide members formed of sheet metal, said guide members being attached to the frame along the edges of the window opening and extending into the spaces between opposite sides of the sash members and the side walls of the recesses, said guide members being provided with bead members for engagement with said grooves.

7. In a window frame and sash construction, a longitudinally slidable sash member provided with longitudinally extending grooves in both of its faces, and guide members having beads formed thereon for engagement with the grooves in the sash member one of which is yieldable.

WILLIAM WOOP.